US012670798B2

(12) United States Patent
Nakadai et al.

(10) Patent No.: US 12,670,798 B2
(45) Date of Patent: Jun. 30, 2026

(54) ALTERNATIVE PLAN PROVISION APPARATUS, CONTROL METHOD, AND NON-TRANSITORY COMPUTER-READABLE STORAGE MEDIUM

(71) Applicants: NEC CORPORATION, Tokyo (JP); Inter-University Research Institute Corporation Research Organization of Information and Systems, Tachikawa (JP)

(72) Inventors: Shinji Nakadai, Tokyo (JP); Bastien Rigault, Tokyo (JP); Artur Goncalves, Tokyo (JP); Helmut Prendinger, Tokyo (JP)

(73) Assignees: NEC CORPORATION, Tokyo (JP); Inter-University Research Institute Corporation Research Organization of Information and Systems, Tachikawa (JP)

( * ) Notice: Subject to any disclaimer, the term of this patent is extended or adjusted under 35 U.S.C. 154(b) by 131 days.

(21) Appl. No.: 18/699,194

(22) PCT Filed: Oct. 17, 2022

(86) PCT No.: PCT/JP2022/038610
§ 371 (c)(1),
(2) Date: Apr. 5, 2024

(87) PCT Pub. No.: WO2023/074443
PCT Pub. Date: May 4, 2023

(65) Prior Publication Data

US 2025/0239166 A1 Jul. 24, 2025

(30) Foreign Application Priority Data

Nov. 1, 2021 (JP) ................................ 2021-178628

(51) Int. Cl.
*G08G 5/34* (2025.01)
*G08G 5/57* (2025.01)
*G08G 5/59* (2025.01)

(52) U.S. Cl.
CPC ................ *G08G 5/34* (2025.01); *G08G 5/57* (2025.01); *G08G 5/59* (2025.01)

(58) Field of Classification Search
CPC ............... G08G 5/34; G08G 5/57; G08G 5/59
See application file for complete search history.

(56) References Cited

U.S. PATENT DOCUMENTS

2021/0097870 A1 4/2021 Nakadai et al.

FOREIGN PATENT DOCUMENTS

EP 0 380 460 A2 8/1990
JP 2017-27175 A 2/2017
(Continued)

OTHER PUBLICATIONS

JP2017027175A machine translation (Year: 2017).*
International Search Report for PCT/JP2022/038610 dated Jan. 10, 2023.

*Primary Examiner* — Navid Z. Mehdizadeh
*Assistant Examiner* — Oliver Tan
(74) *Attorney, Agent, or Firm* — Sughrue Mion, PLLC

(57) ABSTRACT

An alternative plan provision apparatus (2000) generates scan plans for each of an original occupation plan and one or more alternative occupation plans. The scan plan indicates a schedule of a moving object to scan an assigned space without entering a space occupied by a second party that is indicated by the occupation plan. The occupation plan indicates when and what space the second party occupies. One of the occupation plans is an original occupation plan that is provided by the second party, the other occupation plans are alternative occupation plans that are generated based on the original occupation plan. When the scan plan
(Continued)

with highest utility is generated based on one of the alternative occupation plans, the alternative plan provision apparatus (2000) provides the second party with the alternative occupation plan based on which the scan plan with highest utility is generated.

18 Claims, 14 Drawing Sheets

(56) References Cited

FOREIGN PATENT DOCUMENTS

| | | | | |
|---|---|---|---|---|
| JP | 2017027175 | A | * | 2/2017 |
| JP | 2021-144326 | A | | 9/2021 |

* cited by examiner

REMOVAL OPERATION

TRANSFER OPERATION

SHIFT OPERATION

REMOVAL OPERATION

TRANSFER OPERATION

SHIFT OPERATION

MINIMUM DISTANCE

NUMBER OF TURN $$minimum\ scan\ time = \frac{7 * 5 * 30}{17} + \left((5-1) * 2 * 2 * \frac{17}{6.2}\right)$$

$$= 105[sec]$$

TURNING TIME

ALTERNATIVE PLAN PROVISION APPARATUS, CONTROL METHOD, AND NON-TRANSITORY COMPUTER-READABLE STORAGE MEDIUM

This Application is a National Stage of International Application No. PCT/JP2022/038610 filed Oct. 17, 2022, claiming priority based on Japanese Patent Application No. 2021-178628 filed Nov. 1, 2021.

TECHNICAL FIELD

The present disclosure generally relates to a technique to manage space occupations.

BACKGROUND ART

There are needs to occupy a space for some reasons, such as operating a moving object to scan the space, operating a moving object to deliver goods in or through the space, holding an event like a fireworks festival in the space, and so on. In relation to a management of space occupations, PTL1 discloses a technique to detect and resolve conflict between a plurality of moving objects each of which move along a defined path.

CITATION LIST

Patent Literature

PTL1: EP Patent Publication No. EP0380460

SUMMARY OF INVENTION

Technical Problem

PTL1 does not treat a moving object that scans the space. An objective of this disclosure is to provide a novel technique to manage space occupations.

Solution to Problem

The present disclosure provides an alternative plan provision apparatus that comprises at least one processor and memory storing instructions. The at least one processor is configured to execute the instructions to: generate a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan; and when the scan plan with highest utility is generated based on one of the alternative occupation plans, provide the second party with the alternative occupation plan based on which the scan plan with highest utility is generated.

The present disclosure provides a control method performed by a computer. The control method comprises: generating a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan; and when the scan plan with highest utility is generated based on one of the alternative occupation plans, provide the second party with the alternative occupation plan based on which the scan plan with highest utility is generated.

The present disclosure provides a non-transitory computer readable storage medium storing a program that causes a computer to execute the control method of the present disclosure described above.

Advantageous Effects of Invention

According to the present disclosure, a novel technique to manage space occupations is provided.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, a storage unit is formed with one or more storage devices.

First Example Embodiment

Overview

Figure 1:
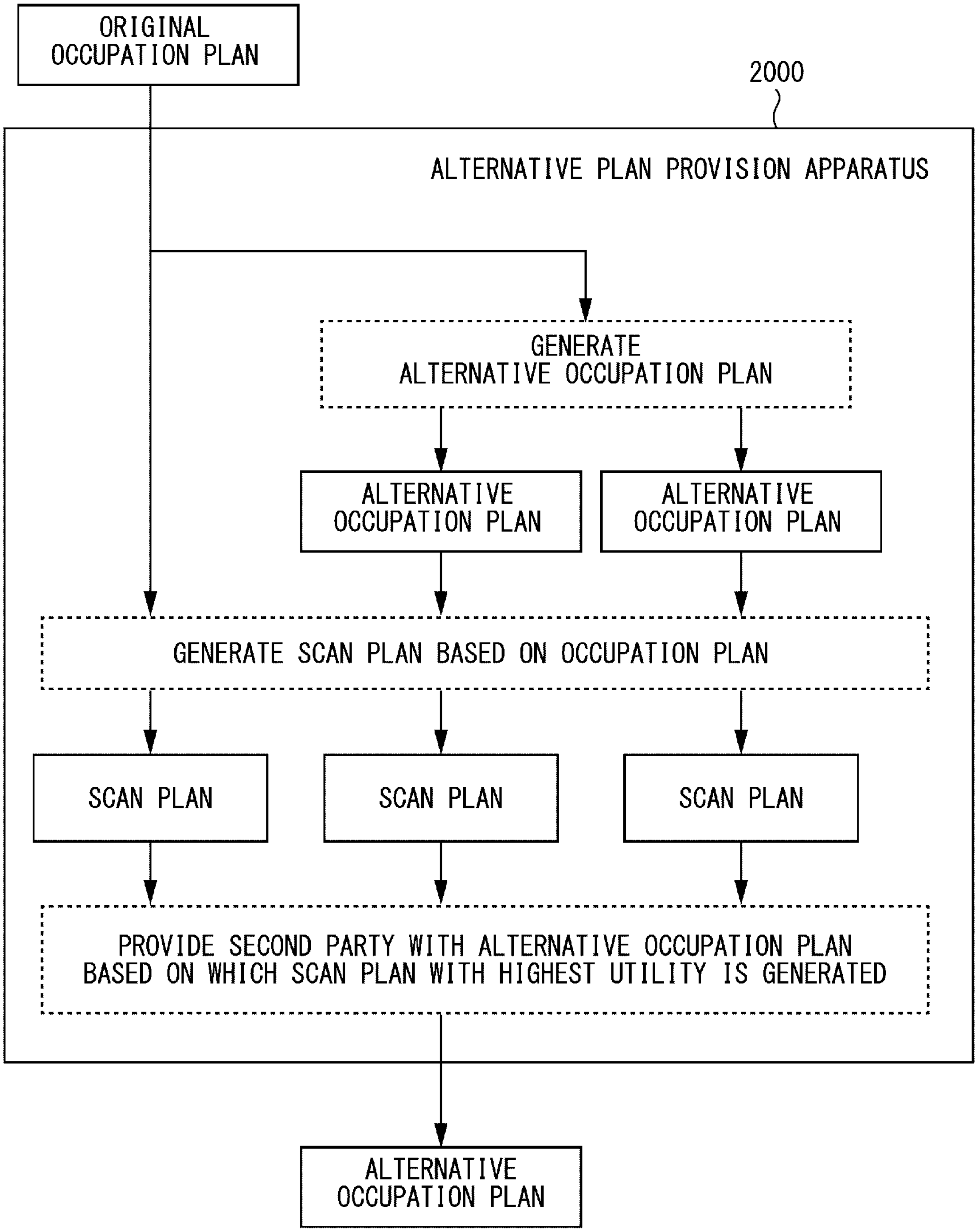
FIG. 1 illustrates an overview of the alternative plan provision apparatus of the first example embodiment.

FIG. 1 illustrates an overview of the alternative plan provision apparatus 2000 of the first example embodiment. Note that the overview illustrated by FIG. 1 shows an example of operations of the alternative plan provision apparatus 2000 to make it easy to understand the alternative plan provision apparatus 2000, and does not limit or narrow the scope of possible operations of the alternative plan provision apparatus 2000.

The alternative plan provision apparatus 2000 generates a scan plan of a moving object of a first party. The scan plan shows a schedule of a scan operation of the moving object. In other words, when and where the moving object is scheduled to travel is indicated by the scan plan.

The moving object may be arbitrary object that can travel in a two-dimensional (2D) space or three-dimensional (3D) space in a controllable manner. For example, the moving object is an autonomous guided vehicle (AGV) that is scheduled to travel in a 2D space such as a floor or a road. In another example, the moving object is a controllable flying object, such as a drone, that is scheduled to fly in a 3D space such as the sky.

The first party may be arbitrary party that is responsible for the moving object of the first party, such as an operator of the moving object or a company that owns or manages the moving object.

The moving object of the first party scan an assigned space in accordance with the scan plan. In this disclosure, "scan of the assigned space" is an operation of moving around in the assigned space so as to cover (visit) all or almost all of locations in the assigned space. The assigned space is a space all of or almost all of which is to be scanned by the moving object.

Figure 2:
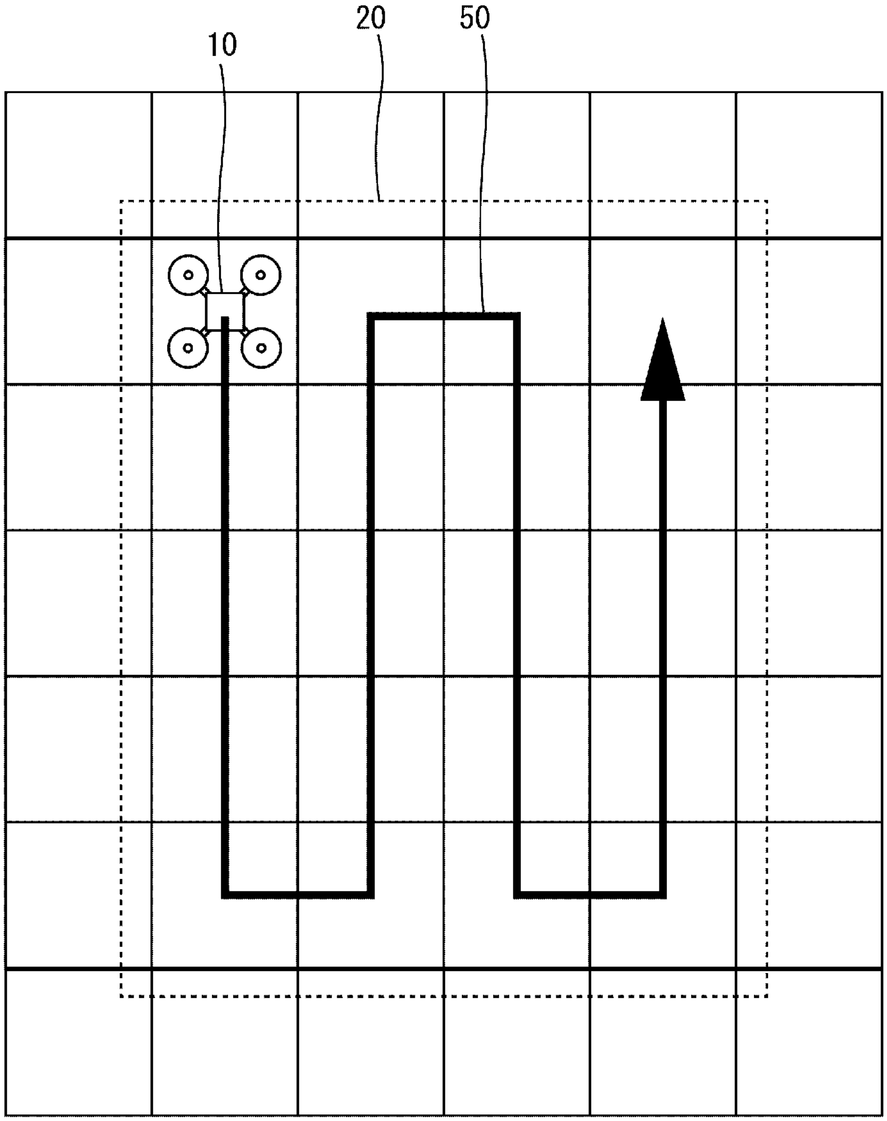
FIG. 2 illustrates an example of the scan of the assigned space.

FIG. 2 illustrates an example of the scan of the assigned space. In FIG. 2, the assigned space 20 is a part of a 2D space that is represented using a 2D grid map. The gid represents a unit of location that the moving object 10 can visit. The moving object 10 scans the assigned space 20 by visiting all or almost all of the grids forming the assigned space 20 along a scan path 50. It is noted that, in this disclosure, the space may be represented by a 3D space instead of a 2D space. In this case, the assigned space 20 may be represented using a 3D grid map.

While the moving object 10 scans the assigned space 20, the moving object 10 or a device attached thereto may perform arbitrary operation. For example, a sensor attached to the moving object 10 may perform sensing operations (e.g., a camera attached to the moving object 10 may capture a video during the scan).

The scan plan is employed to control the scan operation of the moving object 10. As described above, the scan plan shows the schedule of the scan operation of the moving object 10. For example, the scan plan may indicate the scan path along which the moving object 10 travels. The scan path may be represented by time-based data of the locations visited by the moving object 10. In other words, the scan path may be represented by pairs of the location visited by the moving object 10 and time at which the corresponding location is visited.

Figure 3:
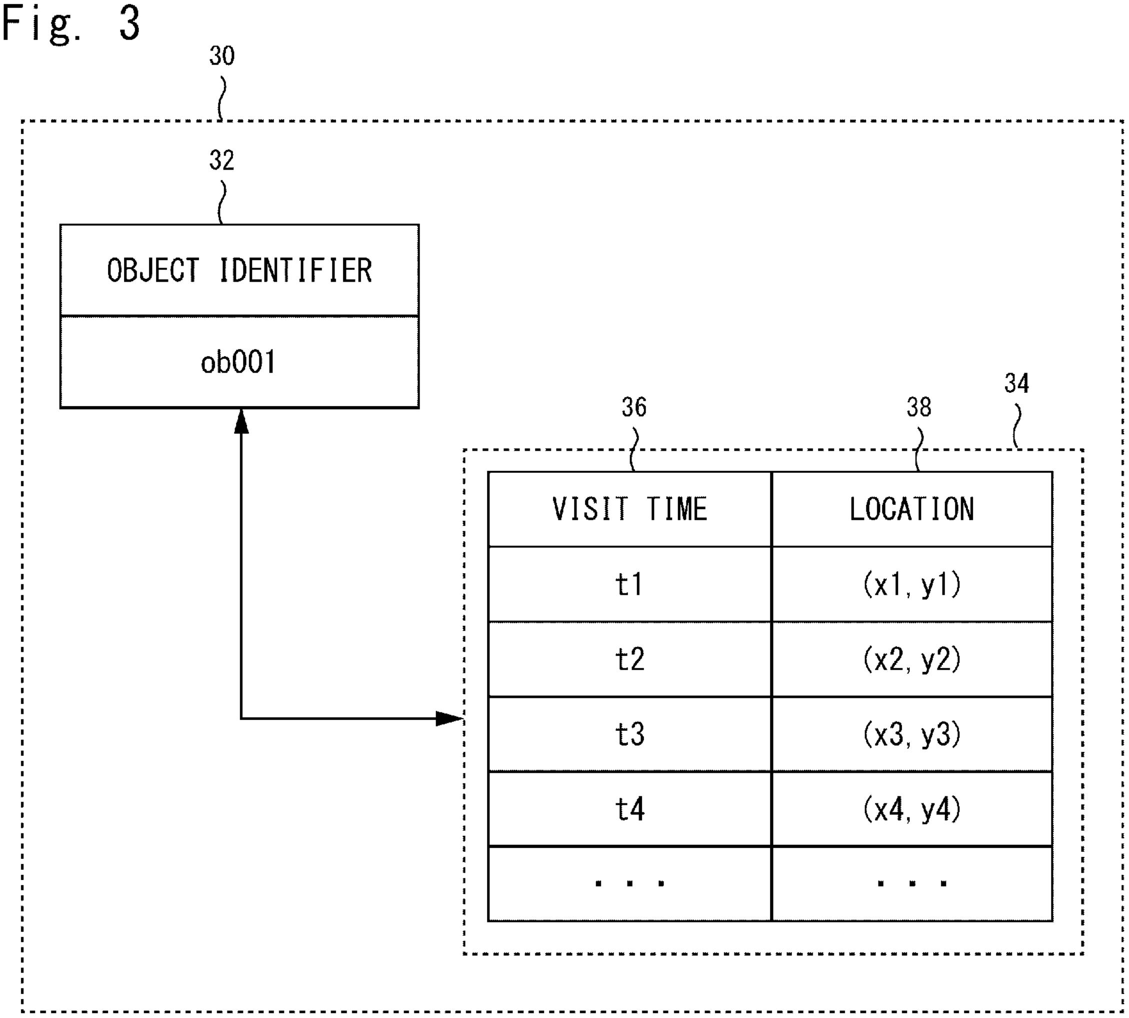
FIG. 3 shows an example structure of the scan plan.

FIG. 3 shows an example structure of the scan plan. In FIG. 3, the scan plan 30 includes an object identifier 32 and a scan path table 34. The object identifier 32 indicates an identifier of the moving object 10. The scan path table 34 includes pairs of two types of data: visit time 36 and location 38. Each row of the scan path table 34 indicates that the moving object 10 is scheduled to visit the corresponding location 38 at the corresponding visit time 36. In FIG. 3, since the moving object 10 is assumed to move around in a 2D space, each location is represented by a 2D coordinate.

In other implementations, the scan plan may represent the schedule of the scan operation of the moving object 10 in a form similar to an occupation plan explained below.

The moving object 10 has to be scheduled to scan the assigned space 20 without entering spaces occupied by a second party. In this disclosure, the second party is arbitrary party other than the first party that occupies some spaces, such as an individual or a company. For example, the second party occupies spaces for delivering goods using a vehicle, such as a drone or an autonomous car. In this case, the second party occupies spaces in which the vehicle travels during the travel of the vehicle. In another example, the second party occupies spaces for having an event, such as a fireworks festival. In this case, the second party occupies spaces in which the event is held during the event. For example, one or more aerial spaces required for fireworks are occupied during the fireworks festival.

The occupation of spaces by the second party is represented by an occupation plan. The occupation plan indicates when and what space the second party occupies. For this purpose, the occupation plan includes one or more volumes each of which indicates a pair of an occupied space and a period of time: the occupied space represents the space occupied by the second party; and the period of time represents when the corresponding occupied space is occupied by the second party.

Figure 4:
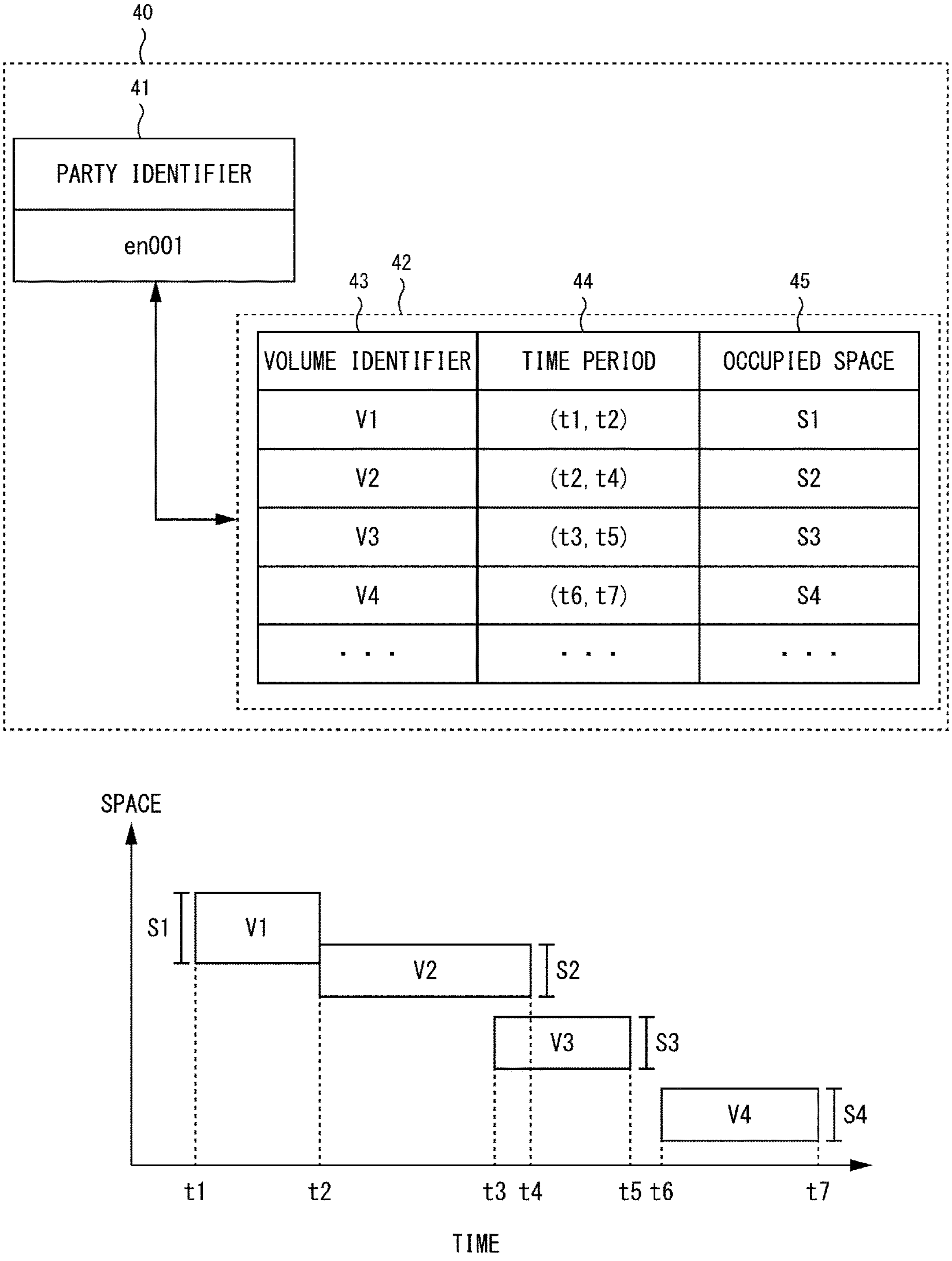
FIG. 4 illustrates an example of the occupation plan.

In the case where the space occupied by the second party varies over time, the occupation plan includes multiple volumes (time-based volumes). FIG. 4 illustrates an example of the occupation plan. At the top of FIG. 4, an example structure of the occupation plan 40 is depicted. Specifically, the occupation plan 40 includes a party identifier 41 and a volume table 42. The party identifier 41 indicates the identifier of the second party. The volume table 42 includes one or more rows each of which represents the volume. The volume is represented by a tuple of a volume identifier 43, a time period 44, and an occupied space 45. The volume identifier 43 indicates the identifier of the volume. The time period 44 indicates the period of time during which the corresponding occupied space 45 is occupied. The occupied space 45 indicates the occupied space.

At the bottom of FIG. 4, the occupation plan is illustrated using a graph. X-axis shows time while Y-axis shows space. As described in this graph, multiple volumes may overlap each other in space (See the volumes V1 and V2), in time (See the volumes V2 and V3), or both (not illustrated). Furthermore, volumes adjacent to each other in time may be apart from each other in time (See the volumes V3 and V4).

In is noted that, as mentioned above, the scan plan may represent the schedule of the scan operation of the moving object 10 in a form similar to the occupation plan. Specifically, the scan plan may represent the schedule of the scan operation of the moving object 10 as a set of volumes. Hereinafter, a set of volumes that represent the schedule of the scan operation of the moving object 10 is called "scan volume set". In addition, each volume in the scan volume set is called "scan volume".

Referring back to FIG. 1, in order to determine an appropriate scan plan, the alternative plan provision apparatus 2000 generates multiple scan plans based on different occupation plans. Specifically, the alternative plan provision apparatus 2000 acquires an original occupation plan that is originally provided by the second party, and generates the scan plan based on the original occupation plan so that the moving object 10 is scheduled to scan the assigned space 20 without entering the occupied spaces indicated by the original occupation plan. In addition, the alternative plan provision apparatus 2000 generates one or more alternative occupation plans modifying the original occupation plan in different ways. The alternative occupation plan is an occupation plan generated by modifying the original occupation plan. Then, also for each alternative occupation plan, the alternative plan provision apparatus 2000 generates the scan plan so that the moving object 10 is scheduled to scan the assigned space 20 without entering the occupied spaces indicated by the corresponding alternative occupation plan.

Hereinafter, a situation where a scan plan indicates the schedule of the scan operation of the moving object 10 with which the moving object 10 enters the occupied space indicated by the occupation plan is described as that "the scan plan conflicts with the occupation plan". Using this expression, it can be described as that the alternative plan provision apparatus 2000 generates each scan plan so as not to conflict with the corresponding occupation plan.

After generating the multiple scan plans, the alternative plan provision apparatus 2000 may provide the second party with the alternative scan plan if needed. Specifically, when the scan plan with highest utility among the generated scan plans is one generated based on an alternative occupation plan, the alternative plan provision apparatus 2000 provides the second party with that alternative occupation plan (i.e., the alternative occupation plan based on which the scan plan with highest utility is generated). The utility of the scan plan will be explained later in detail.

Under the situation where the scan plan with highest utility is generated based on the alternative occupation plan, the first party may prefer this alternative occupation plan to the original one since this alternative occupation plan enables the scan plan to have higher utility. Thus, for the first party, it is preferable that the second party changes its occupation plan to the alternative occupation plan corresponding to the scan plan with highest utility. That is a reason that the alternative plan provision apparatus 2000 provides the second party with the alternative occupation plan corresponding to the scan plan with highest utility.

Suppose that there are the original occupation plan OP1 and three alternative occupation plans AP1, AP2, and AP3. Then, the scan plans SP1 to SP4 are respectively generated based on the occupation plans OP1, AP1, AP2, and AP3. In addition, the scan plan SP3 has the highest utility among the generated scan plans. In this case, the provision unit 2040 provides the second party with the alternative plan AP2 that corresponds to the scan plan SP3.

Example of Advantageous Effect

According to the alternative plan provision apparatus 2000, a novel technique to manage space occupations taking the scan operation of the moving object 10 into account is provided. Specifically, the alternative plan provision apparatus 2000 generates the scan plan of the moving object 10 for each one of the original occupation plan and one or more alternative occupation plans. Then, the alternative occupation plan corresponding to the scan plan with highest utility is provided to the second party when the scan plan with highest utility is generated based on the alternative occupation plan, not based on the original occupation plan. By doing so, the first party can provide the second party with the alternative occupation plan that is more preferable to the original occupation plan from the viewpoint of the first party. As described later, this enables the first party to negotiate with the second party about the space occupation.

Hereinafter, more detailed explanation of the alternative plan provision apparatus 2000 will be described.

Example of Functional Configuration

Figure 5:
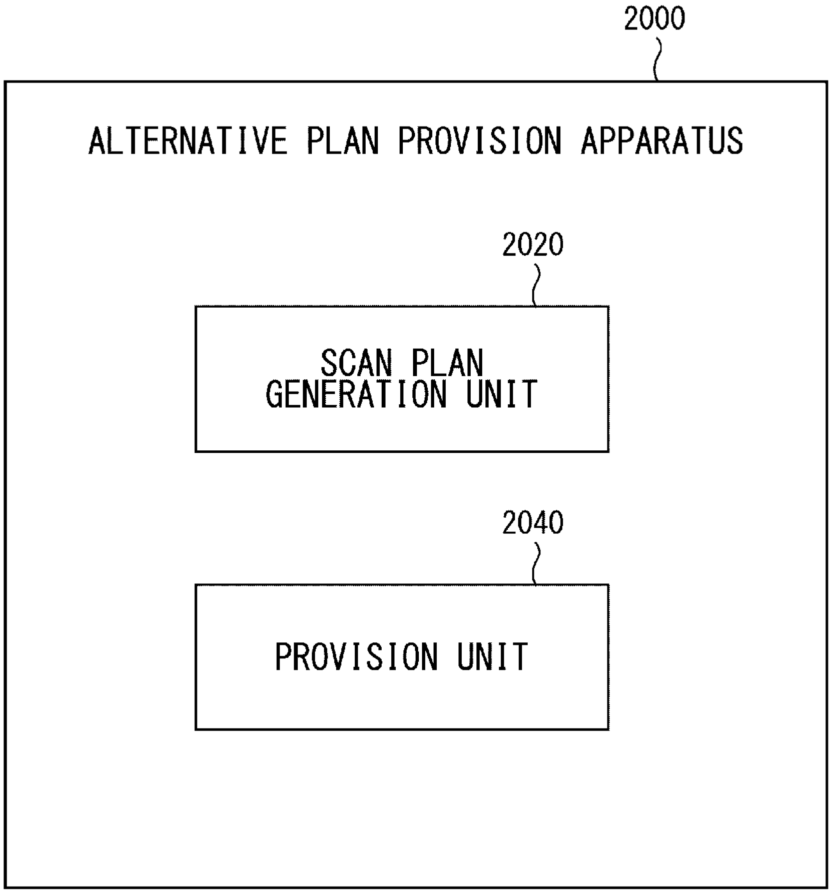
FIG. 5 illustrates an example of a functional configuration of the alternative plan provision apparatus.

FIG. 5 illustrates an example of a functional configuration of the alternative plan provision apparatus 2000. In this example, the alternative plan provision apparatus 2000 includes a scan plan generation unit 2020 and a provision unit 2040. The scan plan generation unit 2020 acquires the original occupation plan. The scan plan generation unit 2020 generates the scan plan based on the original occupation plan so that the scan plan does not conflict with the original occupation plan. The scan plan generation unit 2020 generates one or more alternative occupation plans. For each alternative occupation plan, the scan plan generation unit 2020 generates the scan plan so as not to conflict with the corresponding alternative occupation plan. The provision unit 2040 provides the second party with the alternative occupation plan based on which the scan plan with highest utility is generated, when the scan plan with highest utility is one that is generated based on the alternative occupation plan.

Example of Hardware Configuration

The alternative plan provision apparatus 2000 may be realized by one or more computers. Each of the one or more computers may be a special-purpose computer manufactured for implementing the alternative plan provision apparatus 2000, or may be a general-purpose computer like a personal computer (PC), a server machine, or a mobile device. In some implementations, one or more computers implementing the alternative plan provision apparatus 2000 may be integrated in the moving object 10. In this case, the alternative plan provision apparatus 2000 may be implemented by an integrated circuit, such as a SoC (System on a Chip), that is integrated in the moving object 10.

The alternative plan provision apparatus 2000 may be realized by installing an application in the computer. The application is implemented with a program that causes the computer to function as the alternative plan provision apparatus 2000. In other words, the program is an implementation of the functional units of the alternative plan provision apparatus 2000.

Figure 6:
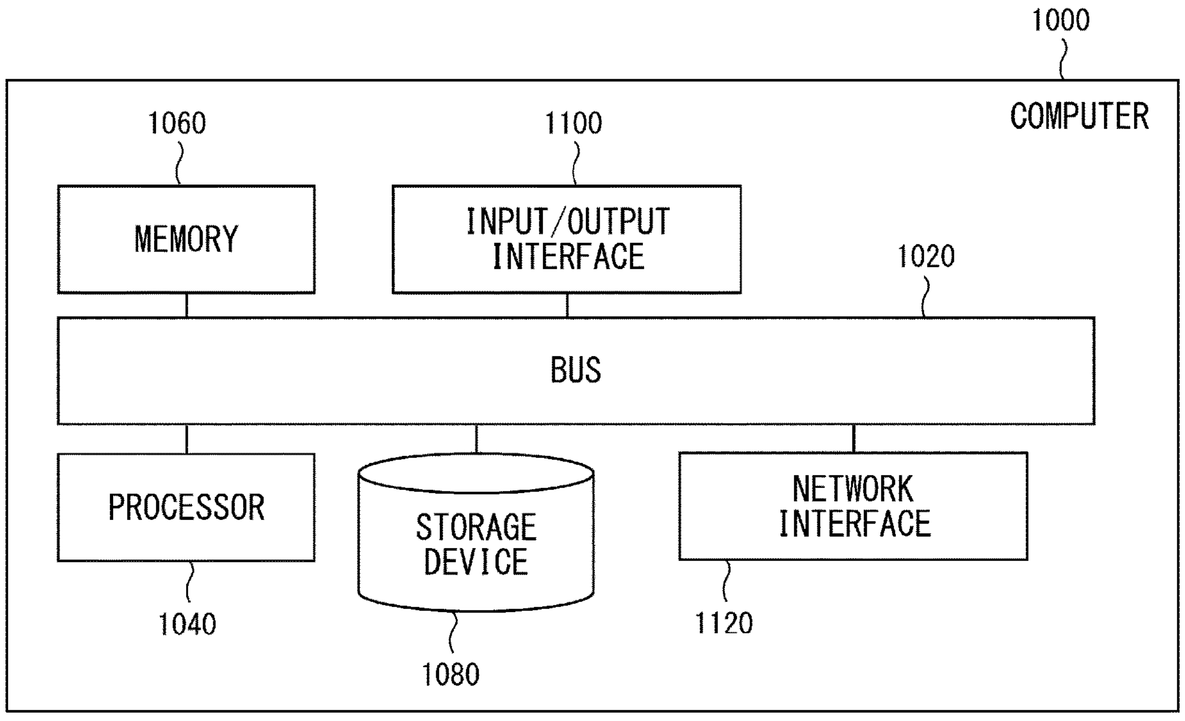
FIG. 6 is a block diagram illustrating an example of the hardware configuration of a computer realizing the alternative plan provision apparatus.

FIG. 6 is a block diagram illustrating an example of hardware configuration of a computer 1000 realizing the alternative plan provision apparatus 2000. In FIG. 6, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the alternative plan provision apparatus 2000.

The hardware configuration of the computer 1000 is not limited to the configuration shown in FIG. 6. For example, as mentioned-above, the alternative plan provision apparatus 2000 may be realized by plural computers. In this case, those computers may be connected with each other through the network.

<Flow of Process>

Figure 7:
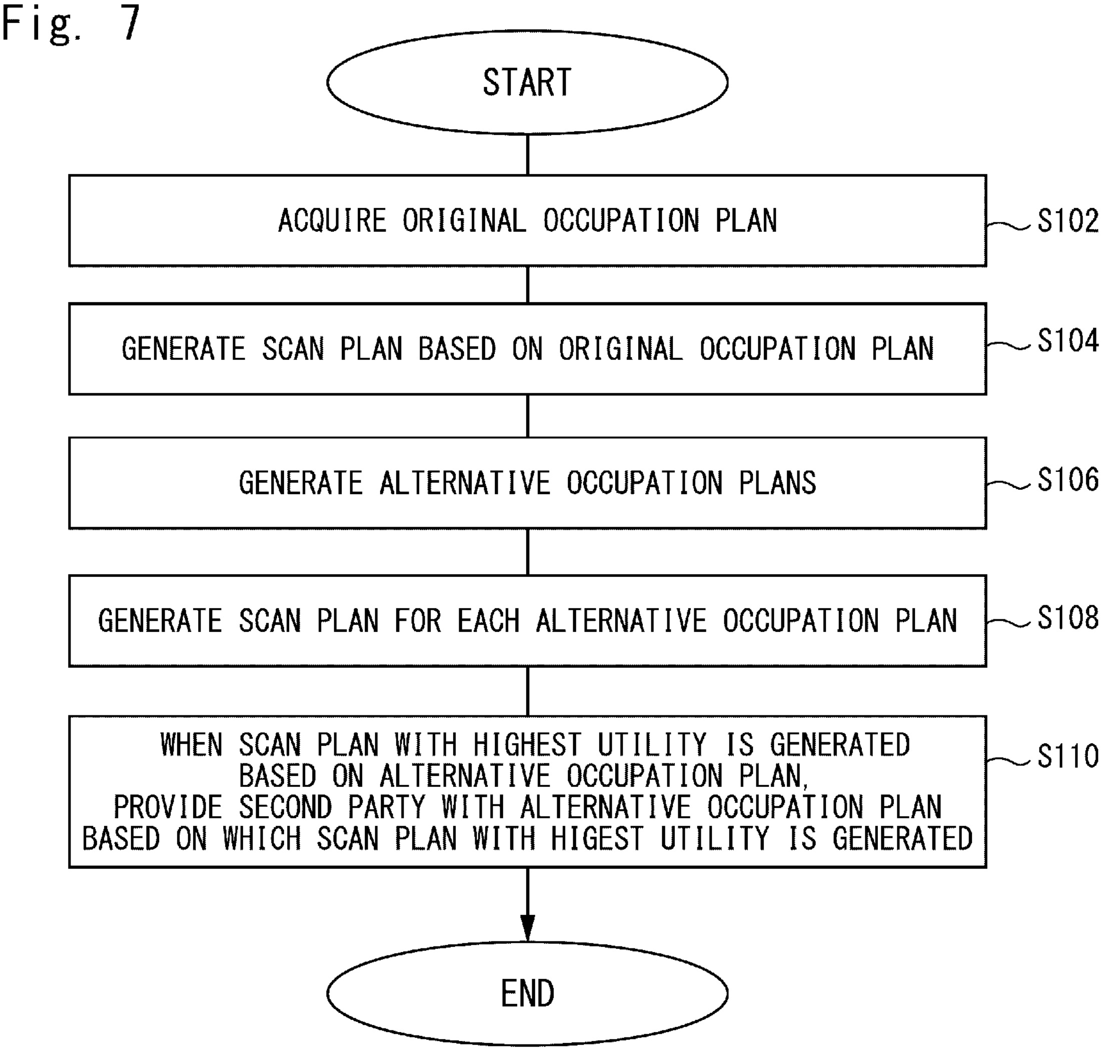
FIG. 7 is a flowchart illustrating an example flow of process performed by the alternative plan provision apparatus.

FIG. 7 is a flowchart illustrating an example flow of process performed by the alternative plan provision apparatus 2000. The scan plan generation unit 2020 acquires the original occupation plan (S102). The scan plan generation unit 2020 generates the scan plan based on the original occupation plan (S104). The scan plan generation unit 2020 generates one or more alternative occupation plans (S106). For each alternative occupation plan, the scan plan generation unit 2020 generates the scan plan based on the corresponding alternative occupation plan (S108). In the case where the scan plan with highest utility is generated based on an alternative occupation plan, the provision unit 2040 provides the second party with the alternative occupation plan corresponding to the scan plan with highest utility (S110).

The flow of process shown in FIG. 7 is merely an example, and some parts may be switched, added, or modified. In some implementations, the alternative plan provision apparatus 2000 may determine whether or not it is necessary to generate the alternative occupation plans before generating them, and performs Step 106 and the subsequent steps only when it is determined that it is necessary to generate the alternative occupation plans. For example, the alternative plan provision apparatus 2000 may determine whether the utility of the scan plan generated based on the original occupation plan is substantially high (e.g., larger than or equal to a threshold) before generating the alternative occupation plan. Then, the alternative plan provision apparatus 2000 performs Step S106 and the subsequent steps only when the utility of the scan plan generated based on the original occupation plan is determined to be not substantially high. On the other hand, in the case where the utility of the scan plan generated based on the original occupation plan is substantially high, Step S106 and the subsequent steps are not performed, and the scan plan based on the original occupation plan may be applied to the moving object 10.

More concrete example of flow of process performed by the alternative plan provision apparatus 2000 will be exemplified with use cases described below.

<Use Cases>

The alternative scan plan may be provided to the second party for the sake of negotiation between the first party and the second party. Hereinafter, as example use cases, negotiations between the first party and the second party using the alternative plan provision apparatus 2000 will be exemplified.

First Example of Negotiation

In this example, the negotiation is initiated by the second party. The scan plan of the moving object 10 is generated before the original occupation plan is provided to the alternative plan provision apparatus 2000. This scan plan is called "original scan plan". When the original scan plan conflicts with the original occupation plan, the second party initiates the negotiation by sending the first party a negotiation request. This negotiation request includes a change request for asking the first party to change the original scan plan.

In some implementations, it is a moving object managed by the second party that sends the negotiation request to the alternative plan provision apparatus 2000. An example of such the moving object is a delivery drone that flies around in an aerial space to deliver goods. In this case, the occupation plan indicates the schedule of the delivery of the delivery drone. In the case where the alternative plan provision apparatus 2000 is implemented in the moving object 10 (e.g., the alternative plan provision apparatus 2000 is implemented as an integrated circuits integrated in the moving object 10), it can be expressed that the moving object 10 of the first party and the moving object of the second party automatically conduct a negotiation with each other so as to resolve the conflict of their schedule.

Figure 8:
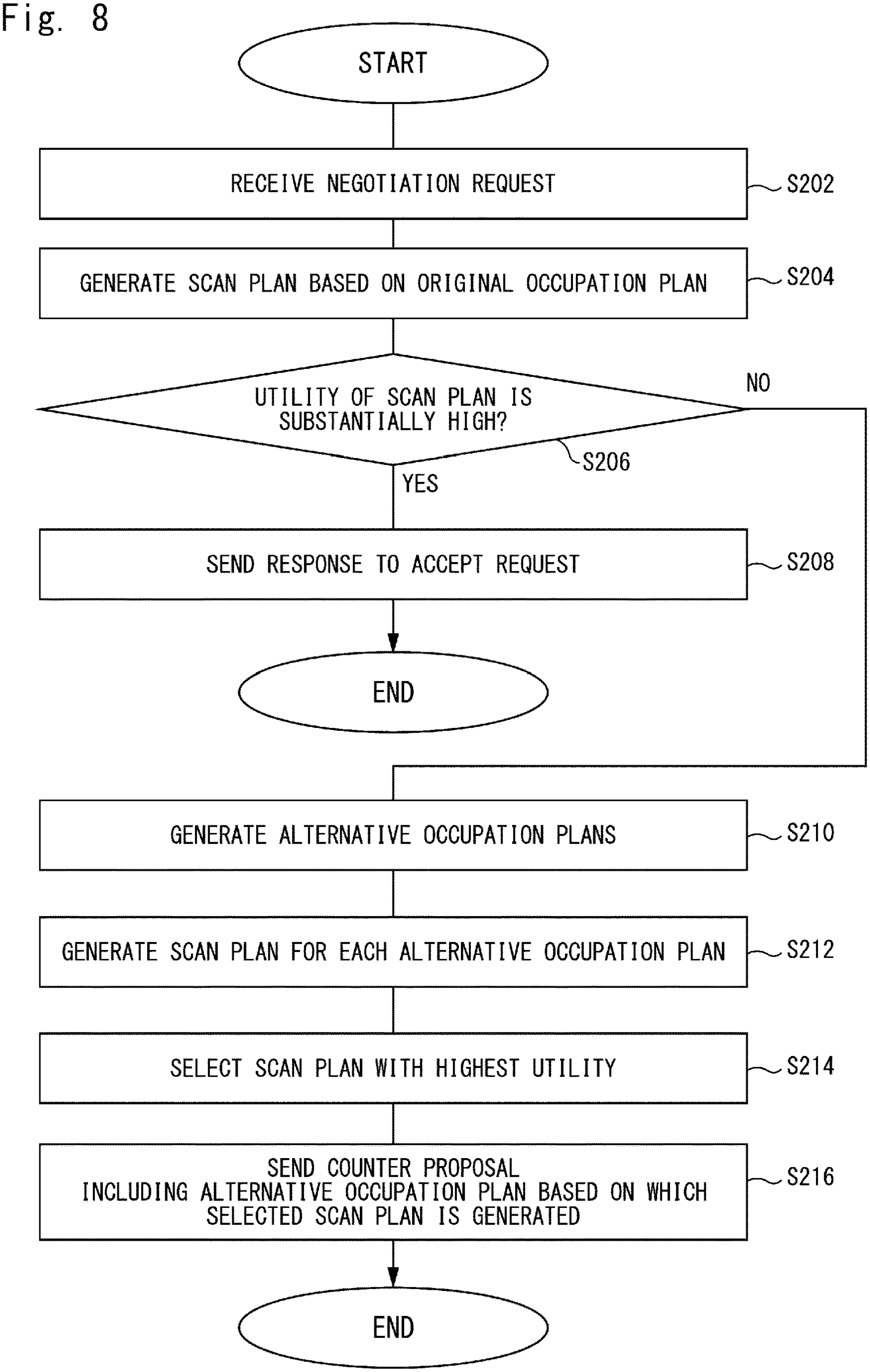
FIG. 8 is a flowchart illustrating an example flow of process that is performed by the alternative plan provision apparatus to conduct a negotiation of the first example with the second party.

FIG. 8 is a flowchart that shows an example flow of process that is performed by the alternative plan provision apparatus 2000 to conduct a negotiation of the first example with the second party. First, the scan plan generation unit 2020 receives a negotiation request from the second party (S202). This request includes the original occupation plan. After receiving the negotiation request, the scan plan generation unit 2020 generates the scan plan that does not conflict with the original occupation plan (S204).

Then, the scan plan generation unit 2020 checks whether or not the utility of this scan plan is substantially high (e.g., larger than or equal to a predefined threshold) (S206), thereby determining whether or not the negotiation request is acceptable. When the utility of this scan plan is substantially high (S206: YES), the alternative plan provision apparatus 2000 sends a response to the second party to accept the negotiation request (S208). This response may include an indication of accepting the request for change of the original scan plan and the scan plan generated based on the original occupation plan. Since the scan plan not conflicting with the original occupation plan is provided from the first party, the second party may accept the response from the first party, resulting in an agreement of the negotiation initiated by the second party.

When the utility of the scan plan corresponding to the original occupation plan is not substantially high (S206: NO), the negotiation request is not acceptable for the first party. Thus, the scan plan generation unit 2020 may try to provide a counter proposal to the second party. The counter proposal may include a request for change of the original occupation plan to the alternative occupation plan based on which the scan plan with substantially high utility is generated.

Specifically, the scan plan generation unit 2020 generates the alternative occupation plans (S210), and generates the scan plan for each alternative occupation plan (S212). Next, the provision unit 2040 selects the scan plan with highest utility (S214). Then, the provision unit 2040 sends the counter proposal to the second party, as a response to the negotiation request from the second party (S216). The counter proposal may include the alternative occupation plan based on which the selected scan plan is generated. In addition, the counter proposal may also include the scan plan corresponding to the alternative occupation plan included in the counter proposal, in order to notify the second party of the updated scan plan.

If the second party accepts the counter proposal, the negotiation reaches an agreement. In this case, the first party manages the moving object 10 so that it performs the scan operation based on the scan plan corresponding to the alternative occupation plan provided to the second party, while the second party occupies the space based on the alternative occupation plan provided by the alternative plan provision apparatus 2000.

In some implementations, when it is determined that the utility of the scan plan corresponding to the original scan plan is not substantially high (S206: NO), the alternative plan provision apparatus 2000 may reject the negotiation request instead of providing a counter proposal. Thus, the negotiation can reach an agreement only when it is possible to generate the scan plan with substantially high utility based on the original occupation plan.

In some implementations, the alternative plan provision apparatus 2000 may reject the negotiation request from the second party when neither one of the scan plans generated based on the alternative occupation plans has substantially high utility. In this case, after selecting the scan plan with the highest utility (S214), the alternative plan provision apparatus 2000 checks whether or not the utility of the selected scan plan is substantially high. When the utility of the selected scan plan is not substantially, the alternative plan provision apparatus 2000 rejects the negotiation request from the second party. This means that the negotiation does not reach an agreement when the alternative plan provision apparatus 2000 fails to generate an appropriate counter proposal (i.e., fails to generate an alternative occupation plan based on which the scan plan with substantially high utility can be generated).

Second Example of Negotiation

In this example, the first party (the alternative plan provision apparatus 2000) initiates a negotiation with the second party if needed. Like the first example of negotiation, it may be a moving object managed by the second party that performs the negotiation with the alternative plan provision apparatus 2000. For example, the alternative plan provision apparatus 2000 integrated in the moving object 10 may send the request to the delivery drone of the second party.

Figure 9:
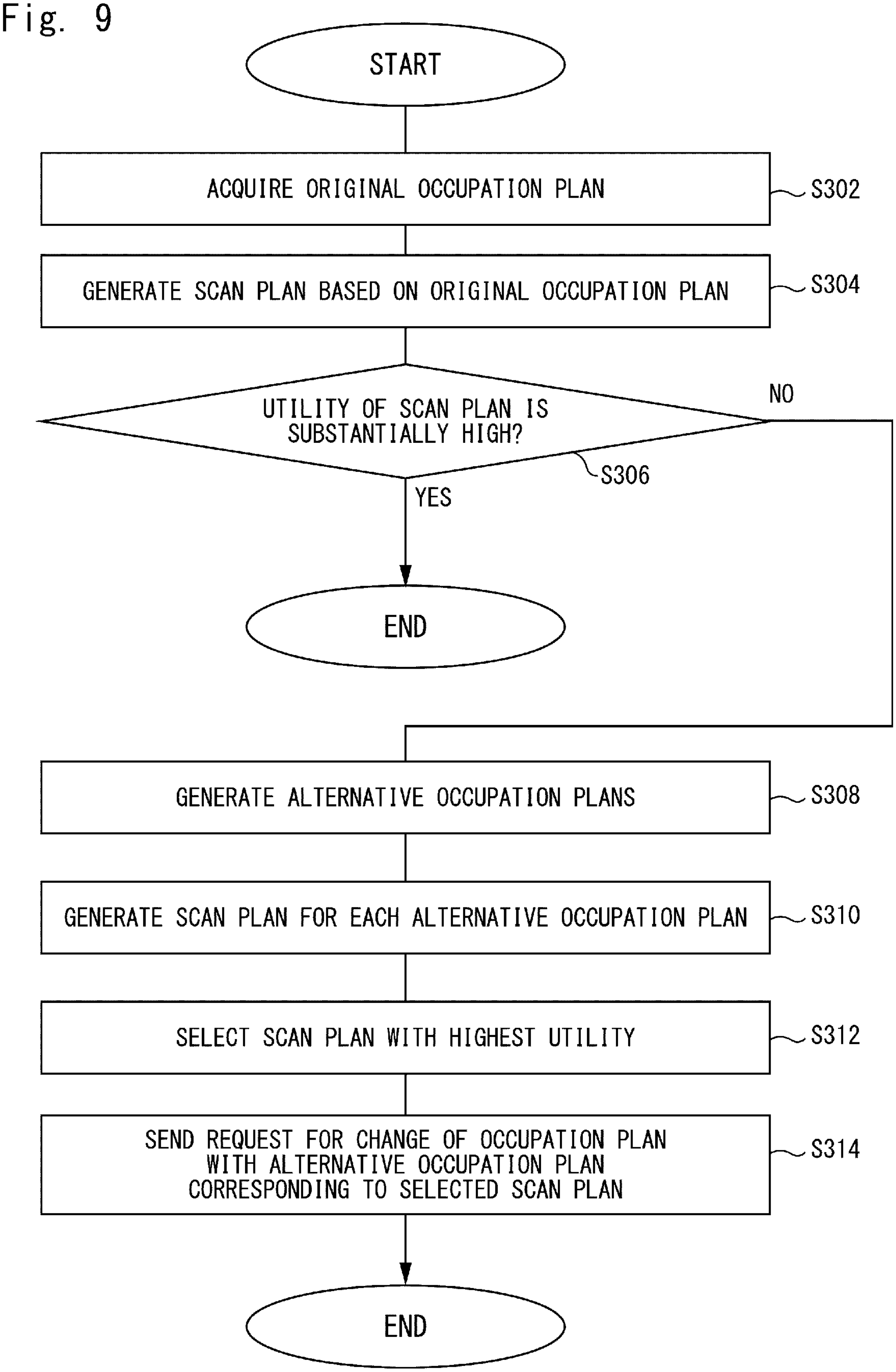
FIG. 9 is a flowchart illustrating an example flow of process that is performed by the alternative plan provision apparatus to initiate a negotiation of the second example with the second party.

FIG. 9 is a flowchart illustrating an example flow of process that is performed by the alternative plan provision apparatus 2000 to initiate a negotiation of the second example with the second party. First, the scan plan generation unit 2020 acquires the original occupation plan (S302). The original occupation plan may be acquired in arbitrary way, such as reading it out from a storage device. Based on the original occupation plan acquired, the scan plan generation unit 2020 generates the scan plan that does not conflict with the original occupation plan (S304).

Then, the scan plan generation unit 2020 checks whether or not the utility of this scan plan is substantially high (S306). When the utility of this scan plan is substantially high (S306: YES), there is no need to initiate a negotiation with the second party since the scan plan with substantially high utility can be generated without modifying the original occupation plan.

On the other hand, the utility of the scan plan corresponding to the original occupation plan does not have substantially high utility (S306: NO), the alternative plan provision apparatus 2000 initiates a negotiation with the second party.

Specifically, the scan plan generation unit 2020 generates the alternative occupation plans (S308), and generates the scan plan for each alternative occupation plan (S310). Next, the provision unit 2040 selects the scan plan with highest utility (S312). Then, the provision unit 2040 sends the second party a request for change of the occupation plan (S314). This request includes the alternative occupation plan that corresponds to the selected scan plan. In order to let the second party to know the scan plan corresponding to the alternative occupation plan provided, it is preferable that the request also includes the scan plan corresponding to the alternative occupation plan provided.

Hereinafter, each function of the alternative plan provision apparatus 2000 will be explained in more detail with referring to the flowchart of FIG. 7.

<Acquisition of Original Occupation Plan: S102>

The scan plan generation unit 2020 acquires the original occupation plan (S102 in FIG. 7). There are various ways to acquire the original occupation plan. In some implementations, the scan plan generation unit 2020 acquires the original occupation plan by reading it out from a storage device in which the original occupation plan is stored in advance. That may be the case where the negotiation is initiated by the first party as exemplified in the second example of negotiation mentioned above.

In other implementations, the original occupation plan is sent from another computer to the alternative plan provision apparatus 2000. In this case, the scan plan generation unit 2020 receives the original occupation plan sent by another computer. That may be the case where the negotiation is initiated by the second party as exemplified in the first example of negotiation mentioned above.

<Generation of Scan Plans: S104 to S108>

The scan plan generation 2020 generates the scan plan for each of the original occupation plan and the alternative occupation plans (S104 to S108 in FIG. 7). Specifically, for each of the original occupation plan and the alternative occupation plans, the scan plan generation 2020 generates the scan plan based on the corresponding occupation plan so as not to conflict with the corresponding occupation plan (i.e., so that the moving object 10 is scheduled to scan the assigned space 20 without entering the occupied spaces indicated by the corresponding occupation plan). The alternative occupation plans are also generated by the scan plan generation unit 2020.

Hereinafter, a way of generating the alternative occupation plan and a way of generating the scan plan will be explained.

<<Generation of Alternative Occupation Plan>>

The alternative occupation plan is generated by modifying a part of the original occupation plan. The occupation plan may be modified by modifying one or more volumes therein. The volume may be modified regarding space (i.e., the occupied space is modified), time (i.e., the period of time is modified), or both. For example, the volume may be generated based on a given path by randomly modifying a start time of a given path and adding a margin in time, space, or both to the path for the safety of travel. In another example, the volume may be generated based on a given path by adding a movement in a random direction at a random point of the given path and adding a margin in time, space, or both to the path for the safety of travel. There may also be various other ways to generate similar volumes based on a given path in a random way.

Modification operation added to the occupied space of a volume may include: removing a portion of the occupied space of the volume; transferring a portion of the occupied space of the volume; and shifting a whole of the occupied space of the volume. The transfer of a portion of the occupied space can be realized by removing a portion of the occupied space and moving it to another location. It is noted that the transfer of a portion of the occupied space may results in the shift of a portion of the occupied space. It is also noted that a portion of the occupied space may be transferred to a location that is separated from the original occupied space.

Figure 10:
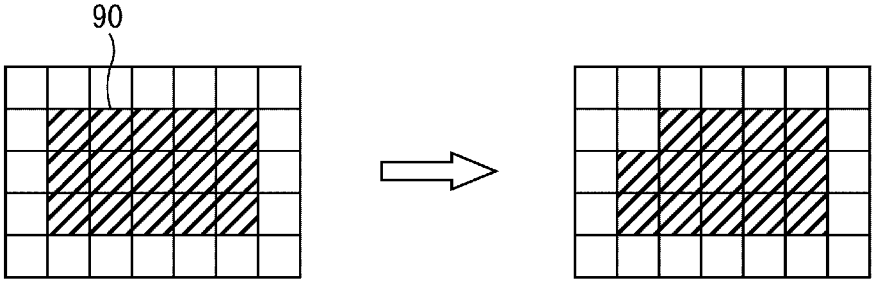
FIG. 10 illustrates examples of modification operation added to the occupied space of the volume.
Figure 10:
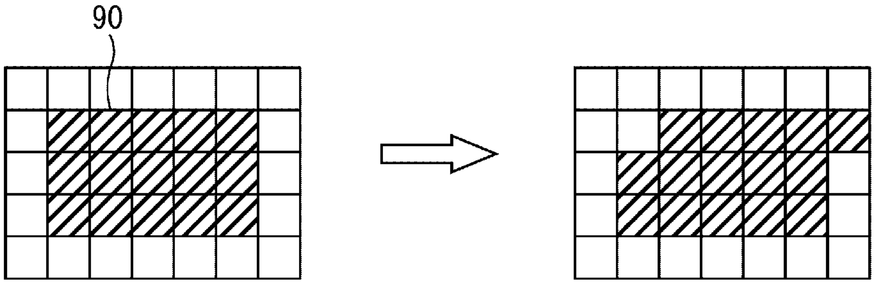
Figure 10:
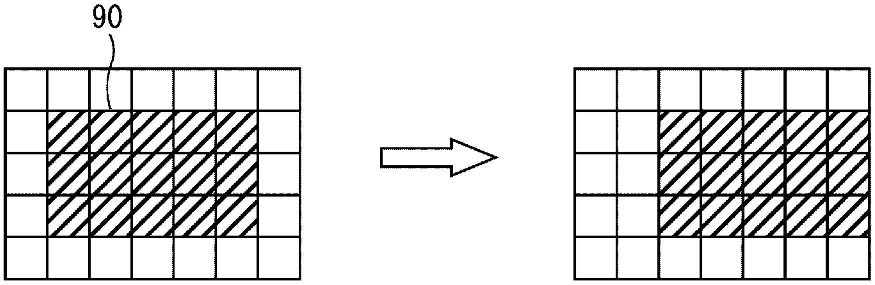

FIG. 10 illustrates examples of modification operation added to the occupied space of the volume. By the removal operation in FIG. 10, the top left grid of the original occupied space 90 is removed. By the transfer operation in FIG. 10, the top left grid of the original occupied space 90 is transferred to another location. By the shift operation in FIG. 10, a whole of the original occupied space 90 is shifted by one grid to the right.

Figure 11:
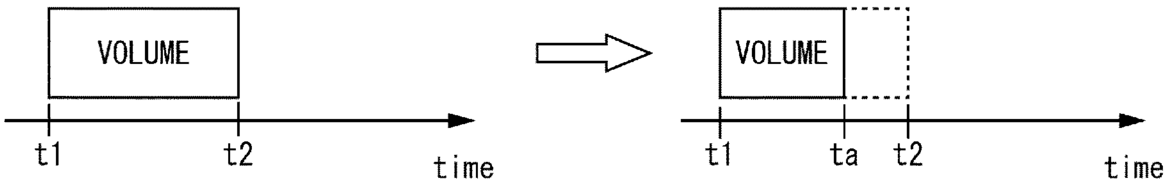
FIG. 11 illustrates examples of modification operation added to the period of time of the volume.
Figure 11:
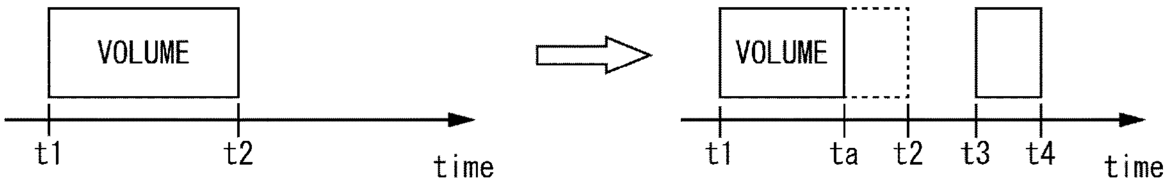
Figure 11:
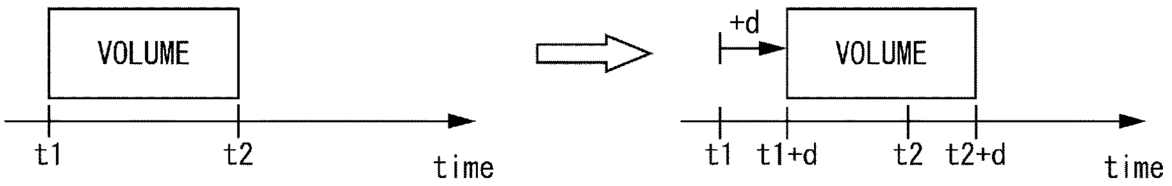

Similarly, modification operation added to the period of time of a volume may include: removing a portion of the period of time of the volume; transferring a portion of the period of time of the volume; and shifting the period of time of the volume. FIG. 11 illustrates examples of modification operation added to the period of time of the volume. In FIG. 11, the original period of time is from time t1 to t2.

By the removing operation in FIG. 11, the period of time from ta to t2 (t1<ta<t2) is removed from the original period of time. By the transfer operation in FIG. 11, the period of time from ta to t2 is transferred to t3 to t4. The duration from ta to t2 is equal to the duration from t3 to t4. By the shift operation in FIG. 11, the period of time from t1 to t2 is shifted by +d. As a result, the original period of time of the volume is changed into the period of time from t1+d to t2+d.

It is noted that modification operations mentioned above are merely examples, and other types of operations that can modify the volume can be employed.

In some implementations, the scan plan generation unit 2020 generates the alternative occupation plan by adding one or more modification operations in a random manner. Specifically, the scan plan generation unit 2020 randomly selects one or more volumes to be modified. The number of volumes to be selected may be pre-defined or randomly determined by the scan plan generation unit 2020. Then, for each of the selected volumes, the scan plan generation unit 2020 randomly selects one or more modification operations mentioned above, and add the selected modification operations to the selected volume. In the case where the selected modification handles a portion of the occupied space or the period of time, those portions may also be determined in a random manner. The number of portions to be selected and the size of each portion may be pre-defined or randomly determined by the scan plan generation unit 2020. Also, where the selected portion is transferred and where the selected portion is shifted may be pre-defined or randomly determined by the scan plan generation unit 2020.

It is noted that, if the original occupation plan includes a plurality of volumes, the modification to the original occupation plan may also include a removal of one or more volumes.

In some implementations, the modification of the original occupation plan may be performed not in a random manner but in a predefined manner. In this case, one or more sets of modifications to the original occupation plan may be preset, and the scan plan generation unit 2020 generates the alternative occupation plan for each preset of the modifications.

<<Generation of Scan Plan>>

The scan plan generation unit 2020 generates the scan plan for each occupation plan so as not to conflict with the corresponding occupation plan. In other words, the scan plan is generated so that the moving object 10 is schedule to scan the assigned space 20 without entering the occupied space indicated by the corresponding occupation plan.

In order to generate the scan plan, the scan plan generation unit 2020 generates one or more candidates (hereinafter, called candidate path) of the scan paths, and select one of them as the scan path. The scan path may be generated using a path search algorithm. Hereinafter, an example of the path search algorithm will be described in detail. It is noted that the algorithm explained below is merely example, and it is possible to employ other path search algorithms that can handle time-based obstacles.

Figure 12:
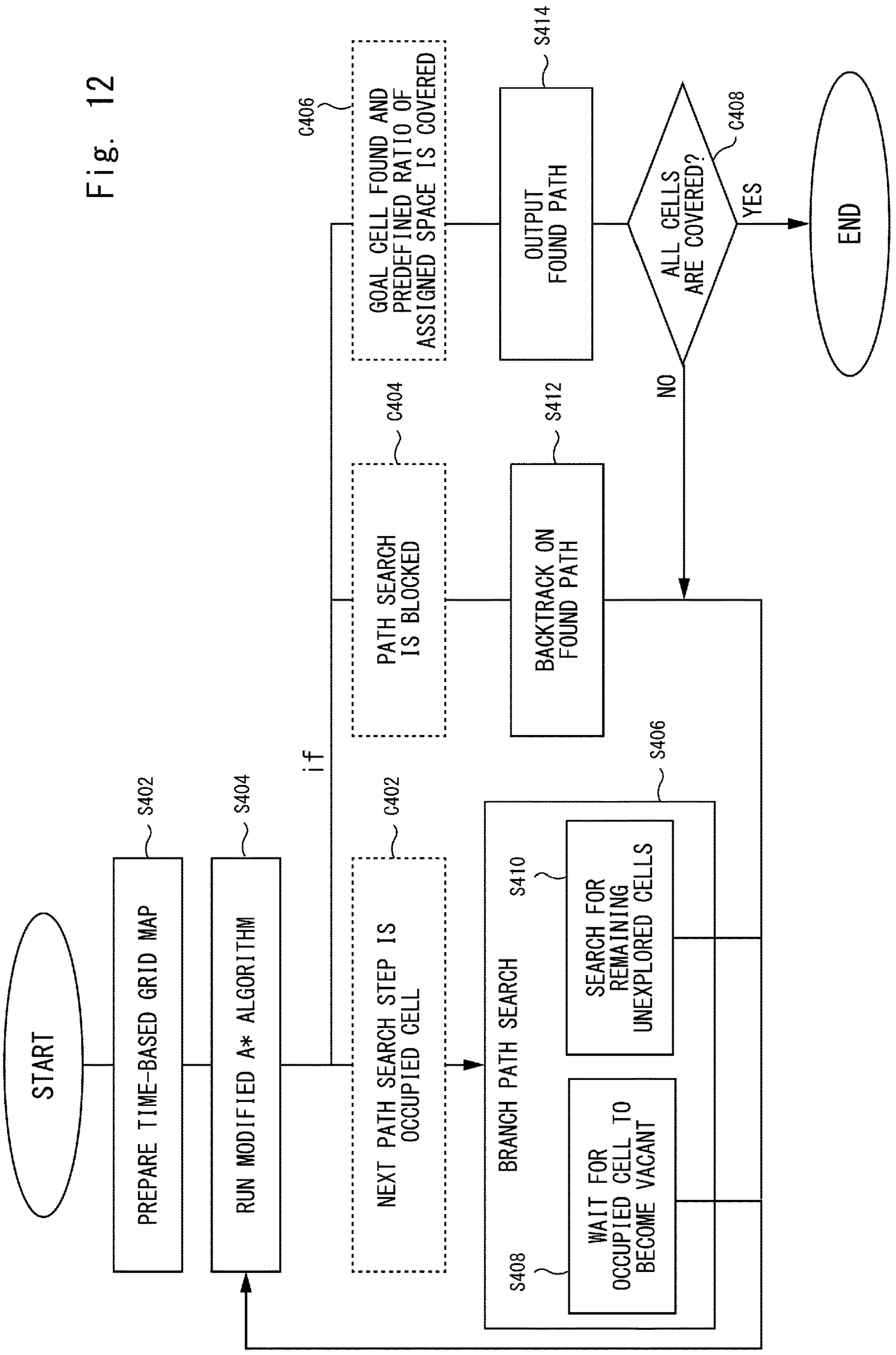
FIG. 12 illustrates a flowchart that shows a path search algorithm for generating the scan plan.

FIG. 12 illustrates a flowchart that shows a path search algorithm to generates one or more candidate paths. This algorithm consists in an A* algorithm with modification on the search tree branching point (Step S408) and implementing a backtrack mechanism (Step S412).

First, the scan plan generation unit 2020 prepares a time-based grid map used for the path search (S402). The time-based grid map indicates the start cell at which the moving object 10 starts the scan operation, the goal cell at which the moving object ends the scan operation, and occupied cells that are occupied by obstacles and into which the scan plan cannot enter. In this grid map, the occupied space indicated by the occupation plan is represented as a set of the occupied cells. Since the occupied space may vary over time in the occupation plan, the grid map is formed as being time-based so that it can show occupied cells that vary over time.

The scan plan generation unit 2020 uses the occupation plan to set occupied cells to the time-based grid map. Specifically, the set of cells corresponding to the occupied space indicated by the occupation plan are set as the occupied cells during the period of time indicated by the occupation plan. In addition, the cells corresponding to a permanent obstacle such as a wall are set as the occupied cells permanently, i.e., from the beginning of scan to the ending of the scan. The scan plan generation unit 2020 also sets, to each cell, a value representing the distance from the goal cell.

After the preparation of the grid map, the scan plan generation unit 2020 runs the modified A* algorithm (S404). In this algorithm, the cost function minimizes the total duration of the path and the search prioritizes the neighbors with the highest value.

When either one of the conditions C402 to C406 is satisfied, the algorithm proceeds with a step corresponding to the satisfied condition. When the next cell the path search is exploring is occupied at the current time (C402 is satisfied), the algorithm will explore the following two possibilities (branch the path search (S406)):

(S408) Wait for the occupied cell to become vacant; or (S410) Search for other unexplored cells.

When the path search is blocked because it has no remaining neighbors to explore (C404 is satisfied), the algorithm backtracks on the found path until it reaches a cell with non-visited neighbors (S412).

When the path search reaches the goal cell and predefined percentage of the assigned space 20 is covered (C406 is satisfied), the algorithm outputs the found path as a candidate path (S414). The predefined percentage is defined so as to detect the situation where almost all of the assigned space 20 is covered. In other words, the situation where the predefined percentage or more of the assigned space 20 is covered is construed as the situation where almost all of the assigned space 20 is covered. The percentage of the assigned space 20 covered by the path may be computed by dividing the number of cells visited at least once by the total number of cells in the assigned space 20. Hereinafter, the percentage of the assigned space 20 covered is called "coverage rate".

In the case where a whole of the assigned space 20 is covered (C408: YES), the execution of the algorithm ends. On the other hand, in the case where there are uncovered cells (C408: NO), the algorithm proceeds with Step S404 to continue the path search.

Since the path search is branched at Step S406 and continues until all cells are covered, the algorithm may output multiple paths. Thus, the scan plan generation unit 2020 may obtain multiple candidate paths as a result of the path search. It is noted that other conditions may be employed to terminate the algorithm. For example, the algorithm may be terminated when a predefined number of candidate paths are output, when a predefined time expires, and so on.

In the case where the multiple candidate paths are obtained, the scan plan generation unit 2020 may select one of the candidate paths as the scan path to be included in the scan plan. For this purpose, the scan plan generation unit 2020 may computes a utility score for each candidate path using a utility function, and selects the candidate path with largest utility score (i.e., highest utility) as the scan path to be included in the scan plan. The utility function may be configured to compute larger utility score for the path as the travel time of the path becomes lower. In this case, the candidate plan with the smallest travel time is selected as the candidate path with the highest utility.

The travel time of the path is time required for the moving object 10 to travel from the start location to the goal location along the path. In a simple manner, the travel time may be computed by dividing the total length of the path by the speed of the moving object 10. The speed of the moving object 10 may be predefined to compute the travel time. In more strict manner, since the moving object 10 takes time not only to go forward but also to turn (i.e., to change the direction), a total time to turn may also be included in the travel time. The speed of the moving object 10 and the time for each turn may be predefined to compute the travel time.

In addition to the travel time, the coverage rate of the candidate path may be taken into consideration. It is considered that the larger the coverage rate of the path is, the more preferable it is for the first entity. Thus, the utility function may be configured to compute larger utility score as the coverage rate of the path becomes larger. The coverage rate of the path may be computed as the number of locations covered by the path over the total number of locations in the assigned space 20.

In some implementations, as described above, the scan plan may represent the schedule of the scan operation of the moving object 10 by the scan volume set. In this case, the scan plan generation unit 2020 may converts each candidate path into a scan volume set, select the scan volume set with highest utility, and include the selected scan volume set into the scan plan. Each volume may be generated by adding a margin in time, space, or both to the corresponding candidate path for the safety of travel.

Figure 13:
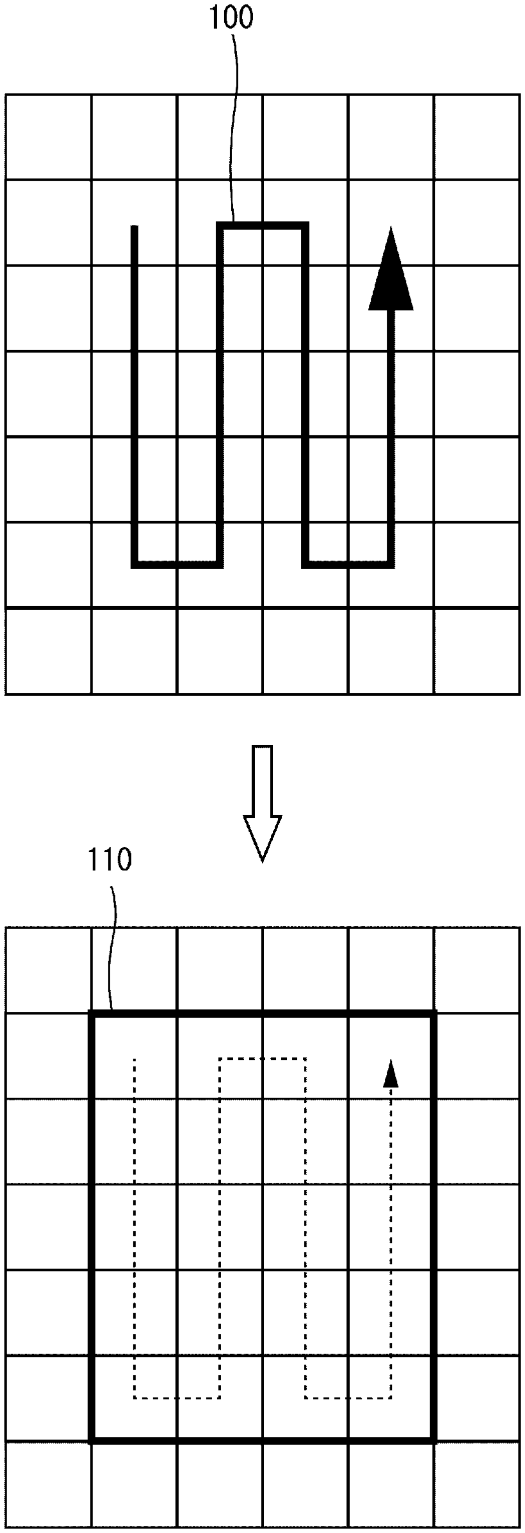
FIG. 13 shows an example of conversion from the path to the occupied space of the volume.

Basically, when converting a path into a single volume, the scan plan generation unit 2020 determines the occupied space and the period of time of the volume based on the path. Regarding the occupied space, the path can be converted into the occupied space that contains a whole of the path. FIG. 13 shows an example of conversion from the path to the occupied space of the volume. In FIG. 13, the path 100 is converted into the occupied space 110 that contains a whole of the path 100.

When the candidate path is a 2D path while the moving object 10 may move three-dimensionally (e.g., flying in the sky), it is preferable to convert the 2D scan path into a 3D occupied space. In this case, for example, the altitude of the moving object 10 is predefined (e.g., a flying altitude of the moving object 10), and the region in altitude of the 3D occupied space is determined based on the predefined altitude. For example, the upper altitude of the 3D occupied space is set to be the predefined altitude plus a predefined width, and the lower altitude of the 3D occupied space is set to be the predefined altitude minus the predefined width.

Regarding the period of time, the volume generated from the path indicates the period of time that contains a whole period of time of the scan operation according to the path. Thus, the period of time of the volume may be set to start at the start time of the scan operation, and to end at the end time of the scan operation.

In order to make it surer to avoid a conflict, it is preferable to add a margin to the volume in space, time, or both. Specifically, the occupied space of the volume may be set to be larger than the smallest one to contain a whole of the path. Similarly, the period of time of the volume may be set to be longer than the shortest one to contain a whole period of time of the scan operation according to the path.

When converting the candidate path into a single scan volume, the scan plan generation unit 2020 works in the way explained above. On the other hand, when converting the candidate path into a set of multiple scan volumes, the scan plan generation unit 2020 divides the candidate path into multiple sub paths, converts each sub path into the scan volume in the way explained above, and generates the scan volume set that includes all of the scan volumes corresponding to the sub paths.

After converting each candidate path into the scan volume set, the scan plan generation unit 2020 computes the utility score for each scan volume set. The utility score of the scan volume set may be represented using a minimum scan time of the scan volume set, which is an expected minimum time required to scan the occupied spaces indicated by the scan volume set. The utility score of the scan volume set may be computed to become larger as the minimum scan time becomes shorter.

The minimum scan time of the scan volume set can be computed as a sum of the minimum scan time of each volume in the scan volume set. The minimum scan time of a volume may be computed using the following equation (1):

Equation 1

$$T_{ms}[V] = \frac{D_{ms}[V]}{S} + (N_t[V] * T_t) \tag{1}$$

wherein T_ms[V] represents the minimum scan time of the volume V; D_ms[V] represents a minimum distance to cover the occupied space of the volume V; S represents a speed of the moving object 10; N_t[V] represents the number of turns that the moving object 10 perform to scan the occupied space of the volume V; and T_t represents the turning time that the moving object 10 takes to turn once.

The minimum distance D_ms[V] may be computed using the following equation (2):

Equation 2

$$D_{ms}[V] = (N_c[V] * L_{sd}[V]) \quad (2)$$

wherein N_c[V] represents the number of cells in the occupied space of the volume V; and L_sd[V] represents the smallest dimension of the cell.

Suppose that the occupied space is represented by cells whose size is 30 m×40 m. In this case, the smallest dimension of the cell is 30m.

The number of turns N_t[V] may be computed using the following equation (3):

Equation 3

$$N_t[V] = (N_{sgd}[V] - 1) * 2 \quad (3)$$

wherein N_sgd[V] represents the number of cells in the smallest grid dimension.

Suppose that the occupied space forms a rectangular shape with grids whose grid dimension is 7×5. In this case, the number of cells in the smallest grid dimension is 5.

The turning time T_t may be computed using the following equation (4):

Equation 4

$$T_t = 2 * S/A \quad (4)$$

wherein S represents the speed of the moving object 10; wherein A represents the acceleration of the moving object 10. Since the turning time does not depend on the volume, it can be computed in advance of the path search and be stored in a storage device so that the scan plan generation unit 2020 can refer to it.

Figure 14:
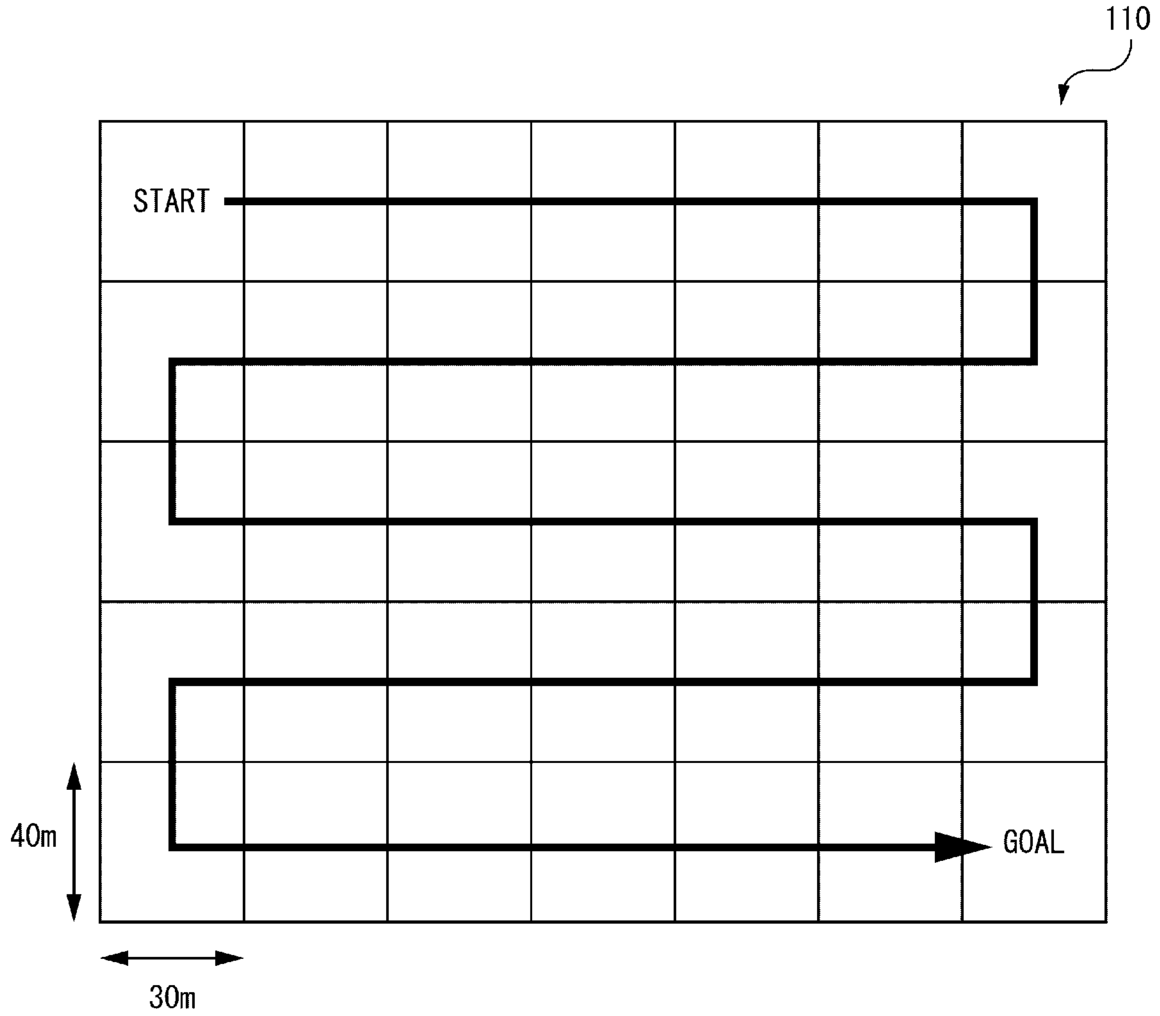
FIG. 14 illustrates the occupied space of the volume for which the minimum scan time is computed.

An example of computing the minimum scan time is explained below with referring to FIG. 14. FIG. 14 illustrates the occupied space of the volume for which the minimum scan time is computed. The occupied space 110 in FIG. 14 has a grid dimension of 7×5. The size of each cell is 30 m×40 m. The speed and acceleration of the moving object 10 are 17 [m/s] and 6.2 [m/s^2] respectively. In this case, the minimum scan time is computed using the equations (1) to (4) as shown in FIG. 14.

The utility of the scan volume set may also be computed taking the coverage rate of the scan volume set into account. The coverage rate of the scan volume set can be computed by dividing the total number of locations in the occupied spaces of the scan volume set by the total number of locations in the assigned space 20. The utility score of the scan volume set may be computed to become larger as the coverage rate of the scan volume set becomes higher.

<Provision of Alternative Occupation Plan: S110>

In the case where the scan plan with highest utility is generated based on the alternative occupation plan, not based on the original occupation plan, this alternative occupation plan is preferable to the original occupation plan for the first party. Thus, the provision unit 2040 provides the second party with the alternative occupation plan corresponding to the selected scan plan (i.e., the alternative occupation plan based on which the scan plan with highest utility is generated).

There are various ways to provide the second party with the alternative occupation plan. In some implementations, the provision unit 2040 may send the second party a message including the alternative occupation plan. In other implementations, the provision unit 2040 may put the alternative occupation plan into a storage device that is shared with the second party. In this case, the second party can obtain the alternative occupation plan from the storage device. It is preferable to notify the second party that the alternative occupation plan is stored in the storage device. This notification may be performed by the provision unit 2040 or the storage device.

There are various situations where the alternative occupation plan is provided to the second party. For example, as exemplified above in the first example of negotiation, the alternative occupation plan is provided to the second party as a counter proposal. In another example, as exemplified above in the second example of negotiation, the alternative occupation plan is provided to the second party as a request for change of the occupation plan.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The programs mentioned in this disclosure include instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes.

Supplementary Notes (Supplementary Note 1)

An alternative plan provision apparatus comprising:

at least one processor; and memory storing instructions;

wherein the at least one processor is configured to execute the instructions to:

generate a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan; and when the scan plan with highest utility is generated based on one of the alternative occupation plans, provide the second party with the alternative occupation plan based on which the scan plan with highest utility is generated.

(Supplementary Note 2)

The alternative plan provision apparatus according to supplementary note 1, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

(Supplementary Note 3)

The alternative plan provision apparatus according to supplementary note 2, wherein the at least one processor is configured to execute the instructions further to receive a negotiation request from the second party, the negotiation request being a request for change of an original scan plan and including the original occupation plan, the original scan plan being the scan plan that is generated before the reception of the negotiation request, and the provision of the alternative occupation plan includes sending a response to the negotiation request to the second party, the response including a request for change of the original occupation plan into the alternative occupation plan based on which the scan plan with highest utility is generated.

(Supplementary Note 4)

The alternative plan provision apparatus according to supplementary note 2, wherein the provision of the alternative occupation plan includes sending a negotiation request to the second party, the negotiation request including a request for change of the original occupation plan into the alternative occupation plan based on which the scan plan with highest utility is generated.

(Supplementary Note 5)

The alternative plan provision apparatus according to any one of supplementary notes 1 to 4, wherein the utility of the scan plan increases as time required to scan the assigned space in accordance with the scan plan decreases.

(Supplementary Note 6)

The alternative plan provision apparatus according to any one of supplementary notes 1 to 5, wherein the utility of the scan plan increases as a percentage of the assigned space scanned by the moving object based on the scan plan increases.

(Supplementary Note 7)

A control method executed by a computer, comprising:

generating a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan; and when the scan plan with highest utility is generated based on one of the alternative occupation plans, providing the second party with the alternative occupation plan based on which the scan plan with highest utility is generated.

(Supplementary Note 8)

The control method according to supplementary note 7, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

(Supplementary Note 9)

The control method according to supplementary note 8, further comprising:

receiving a negotiation request from the second party, the negotiation request being a request for change of an original scan plan and including the original occupation plan, the original scan plan being the scan plan that is generated before the reception of the negotiation request, wherein the provision of the alternative occupation plan includes sending a response to the negotiation request to the second party, the response including a request for change of the original occupation plan into the alternative occupation plan based on which the scan plan with highest utility is generated.

(Supplementary Note 10)

The control method according to supplementary note 8, wherein the provision of the alternative occupation plan includes sending a negotiation request to the second party, the negotiation request including a request for change of the original occupation plan into the alternative occupation plan based on which the scan plan with highest utility is generated.

(Supplementary Note 11)

The control method according to any one of supplementary notes 7 to 10, wherein the utility of the scan plan increases as time required to scan the assigned space in accordance with the scan plan decreases.

(Supplementary Note 12)

The control method according to any one of supplementary notes 7 to 11, wherein the utility of the scan plan increases as a percentage of the assigned space scanned by the moving object based on the scan plan increases.

(Supplementary Note 13)

A non-transitory computer-readable storage medium storing a program that causes a computer to execute:

generating a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan; and when the scan plan with highest utility is generated based on one of the alternative occupation plans, providing the second party with the alternative occupation plan based on which the scan plan with highest utility is generated.

(Supplementary Note 14)

The storage medium according to supplementary note 13, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

(Supplementary Note 15)

The storage medium according to supplementary note 14, wherein the program causes the computer to further execute receiving a negotiation request from the second party, the negotiation request being a request for change of an original scan plan and including the original occupation plan, the original scan plan being the scan plan that is generated before the reception of the negotiation request, wherein the provision of the alternative occupation plan includes sending a response to the negotiation request to the second party, the response including a request for change of the original occupation plan into the alternative occupation plan based on which the scan plan with highest utility is generated.

(Supplementary Note 16)

The storage medium according to supplementary note 14, wherein the provision of the alternative occupation plan includes sending a negotiation request to the second party, the negotiation request including a request for change of the original occupation plan into the alternative occupation plan based on which the scan plan with highest utility is generated.

(Supplementary Note 17)

The storage medium according to any one of supplementary notes 13 to 16, wherein the utility of the scan plan increases as time required to scan the assigned space in accordance with the scan plan decreases.

(Supplementary Note 18)

The storage medium according to any one of supplementary notes 13 to 17, wherein the utility of the scan plan increases as a percentage of the assigned space scanned by the moving object based on the scan plan increases.

This application is based upon and claims the benefit of priority from Japanese patent application No. 2021-178628, filed on Nov. 1, 2021, the disclosure of which is incorporated herein in its entirety by reference.

REFERENCE SIGNS LIST

10 moving object
20 assigned space
30 scan plan
32 object identifier
34 scan path table
36 visit time
38 location
40 occupation plan
41 party identifier
42 volume table
43 volume identifier
44 time period
45 occupied space
50 scan path
90 occupied space
100 path
110 occupied space
1000 computer
1020 bus
1040 processor
1060 memory
1080 storage device
1100 input/output interface
1120 network interface
2000 alternative plan provision apparatus
2020 scan plan generation unit
2040 provision unit

The invention claimed is:

1. An alternative plan provision apparatus comprising:

at least one processor; and memory storing instructions;

wherein the at least one processor is configured to execute the instructions to:

generate a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan;

when the scan plan with highest utility is generated based on one of the alternative occupation plans, provide the second party with the alternative occupation plan based on which the scan plan with highest utility is generated; and control the moving object to move according to the scan plan.

2. The alternative plan provision apparatus according to claim 1, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

3. The alternative plan provision apparatus according to claim 2, wherein the at least one processor is configured to execute the instructions further to receive a negotiation request from the second party, the negotiation request being a request for change of an original scan plan and including the original occupation plan, the original scan plan being the scan plan that is generated before the reception of the negotiation request, and the provision of the alternative occupation plan includes sending a response to the negotiation request to the second party, the response including a request for change of the original occupation plan into the alternative occupation plan based on which the scan plan with highest utility is generated.

4. The alternative plan provision apparatus according to claim 2, wherein the provision of the alternative occupation plan includes sending a negotiation request to the second party, the negotiation request including a request for change of the original occupation plan into the alternative occupation plan based on which the scan plan with highest utility is generated.

5. The alternative plan provision apparatus according to claim 1, wherein the utility of the scan plan increases as time required to scan the assigned space in accordance with the scan plan decreases.

6. The alternative plan provision apparatus according to claim 1, wherein the utility of the scan plan increases as a percentage of the assigned space scanned by the moving object based on the scan plan increases.

7. A control method executed by a computer, comprising:

generating a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan;

when the scan plan with highest utility is generated based on one of the alternative occupation plans, providing the second party with the alternative occupation plan based on which the scan plan with highest utility is generated; and controlling the moving object to move according to the scan plan.

8. The control method according to claim 7, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

9. The control method according to claim 8, further comprising:

receiving a negotiation request from the second party, the negotiation request being a request for change of an original scan plan and including the original occupation plan, the original scan plan being the scan plan that is generated before the reception of the negotiation request, wherein the provision of the alternative occupation plan includes sending a response to the negotiation request to the second party, the response including a request for change of the original occupation plan into the alternative occupation plan based on which the scan plan with highest utility is generated.

10. The control method according to claim 8, wherein the provision of the alternative occupation plan includes sending a negotiation request to the second party, the negotiation request including a request for change of the original occupation plan into the alternative occupation plan based on which the scan plan with highest utility is generated.

11. The control method according to claim 7, wherein the utility of the scan plan increases as time required to scan the assigned space in accordance with the scan plan decreases.

12. The control method according to claim 7, wherein the utility of the scan plan increases as a percentage of the assigned space scanned by the moving object based on the scan plan increases.

13. A non-transitory computer-readable storage medium storing a program that causes a computer to execute:

generating a scan plan of a moving object of a first party for each one of a plurality of occupation plans, the scan plan indicating a schedule of the moving object to scan an assigned space without entering a space occupied by a second party that is indicated by the occupation plan, the occupation plan indicating when and what space the second party occupies, one of the occupation plans being an original occupation plan that is provided by the second party, the occupation plans other than the original occupation plan being alternative occupation plans that are generated based on the original occupation plan;

when the scan plan with highest utility is generated based on one of the alternative occupation plans, providing the second party with the alternative occupation plan based on which the scan plan with highest utility is generated; and controlling the moving object to move according to the scan plan.

14. The storage medium according to claim 13, wherein the generation of the scan plans includes:

generating the scan plan based on the original occupation plan;

in the case where the utility of the scan plan generated based on the original occupation plan is lower than a threshold, further performing:

generating one or more alternative occupation plans by modifying the original occupation plan; and generating the scan plan for each of the alternative occupation plans.

15. The storage medium according to claim 14, wherein the program causes the computer to further execute receiving a negotiation request from the second party, the negotiation request being a request for change of an original scan plan and including the original occupation plan, the original scan plan being the scan plan that is generated before the reception of the negotiation request, wherein the provision of the alternative occupation plan includes sending a response to the negotiation request to the second party, the response including a request for change of the original occupation plan into the alternative occupation plan based on which the scan plan with highest utility is generated.

16. The storage medium according to claim 14, wherein the provision of the alternative occupation plan includes sending a negotiation request to the second party, the negotiation request including a request for change of the original occupation plan into the alternative occupation plan based on which the scan plan with highest utility is generated.

17. The storage medium according to claim 13, wherein the utility of the scan plan increases as time required to scan the assigned space in accordance with the scan plan decreases.

18. The storage medium according to claim 13, wherein the utility of the scan plan increases as a percentage of the assigned space scanned by the moving object based on the scan plan increases.

* * * * *